United States Patent
Singh et al.

(10) Patent No.: US 9,392,598 B2
(45) Date of Patent: Jul. 12, 2016

(54) METHOD AND SYSTEM FOR COMMUNICATING BETWEEN SMALL CELLS USING OVER-THE-AIR TRANSMISSIONS

(71) Applicant: QUALCOMM Incorporated, San Diego, CA (US)

(72) Inventors: Damanjit Singh, San Diego, CA (US); Peerapol Tinnakornsrisuphap, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 13/787,778

(22) Filed: Mar. 6, 2013

(65) Prior Publication Data
US 2013/0235816 A1 Sep. 12, 2013

Related U.S. Application Data

(60) Provisional application No. 61/609,227, filed on Mar. 9, 2012.

(51) Int. Cl.
*H04W 72/04* (2009.01)
*H04W 36/00* (2009.01)
(Continued)

(52) U.S. Cl.
CPC ...... *H04W 72/0426* (2013.01); *H04W 36/0016* (2013.01); *H04W 76/023* (2013.01); *H04W 84/045* (2013.01); *H04W 92/20* (2013.01)

(58) Field of Classification Search
CPC ............ H04W 28/0205; H04W 28/0231; H04W 28/0236; H04W 28/0284; H04W 12/2602; H04W 28/08; H04W 36/0022; H04W 36/0033; H04W 36/0083; H04W 36/0094; H04W 36/20; H04W 72/06–72/08; H04W 84/10
USPC ............. 370/310.2, 315, 322, 328–332, 334, 370/338, 341, 343, 346–348, 436–437; 455/432.1, 434, 443–444, 448–450, 45
See application file for complete search history.

(56) References Cited

U.S. PATENT DOCUMENTS 7,630,339 B2 * 12/2009 Laroia .................. H04B 7/0626
370/330
8,351,379 B2 1/2013 Hui et al.
(Continued)

FOREIGN PATENT DOCUMENTS

EP 2161964 A1 3/2010
GB 2480692 A 11/2011
(Continued)

OTHER PUBLICATIONS

3GPP TS 36.423 V11.0.0 (Mar. 2012), "3rd Generation Partnership Project; Technical Specification Group Radio Access Network; Evolved Universal Terrestrial Radio Access Network (E-UTRAN); X2 application protocol (X2AP) (Release 11)", 3GPP Draft; Draft 36423-B00, 3rd Generation Partnership Project (3GPP), Mobile Competence Centre ; 650, Route Des Lucioles ; F-06921 Sophia-Antipolis Cedex ; France, Mar. 2, 2012, XP050565945, [retrieved on Mar. 2, 2012].
(Continued)

*Primary Examiner* — Mohamed Kamara

(57) ABSTRACT

A system performs an over-the-air transmission from a source small cell to a destination small cell. A channel for the over-the-air transmission is selected based on information to be sent. The system determines an information attribute for an over-the-air transmission from the source small cell to the destination small cell. The system selects an over-the-air channel, from a set of channels, based on the information attribute. The source small cell sends the over-the-air transmission on the selected over-the-air channel to the destination small cell.

38 Claims, 9 Drawing Sheets

(51) Int. Cl.
*H04W 76/02* (2009.01)
*H04W 84/04* (2009.01)
*H04W 92/20* (2009.01)

(56) References Cited

U.S. PATENT DOCUMENTS

| | | | |
|---|---|---|---|
| 8,781,480 B2* | 7/2014 | Lim | H04W 36/04 |
| | | | 370/331 |
| 2009/0135790 A1 | 5/2009 | Yavuz et al. | |
| 2009/0215442 A1* | 8/2009 | Lindoff | H04B 1/036 |
| | | | 455/423 |
| 2009/0279497 A1* | 11/2009 | Nogami et al. | 370/329 |
| 2010/0027694 A1 | 2/2010 | Touboul et al. | |
| 2010/0105390 A1* | 4/2010 | Ishii | H04W 72/1242 |
| | | | 455/436 |
| 2010/0118698 A1* | 5/2010 | Yokobori | H04W 74/085 |
| | | | 370/230 |
| 2010/0202388 A1 | 8/2010 | Madan et al. | |
| 2010/0267408 A1 | 10/2010 | Lee et al. | |
| 2011/0028175 A1 | 2/2011 | Chang et al. | |
| 2011/0070889 A1* | 3/2011 | Li | H04W 36/0033 |
| | | | 455/436 |
| 2011/0136494 A1* | 6/2011 | Kim | H04W 72/0426 |
| | | | 455/450 |
| 2011/0149923 A1* | 6/2011 | Ishikawa | H04W 72/0446 |
| | | | 370/336 |
| 2011/0249642 A1 | 10/2011 | Song et al. | |
| 2011/0299488 A1* | 12/2011 | Kim | H04W 16/16 |
| | | | 370/329 |
| 2012/0002637 A1 | 1/2012 | Adjakple et al. | |
| 2012/0163336 A1* | 6/2012 | Adjakple | H04W 12/04 |
| | | | 370/331 |
| 2014/0031057 A1* | 1/2014 | Brassil et al. | 455/456.1 |
| 2014/0342743 A1* | 11/2014 | Patini | H04W 40/248 |
| | | | 455/445 |

FOREIGN PATENT DOCUMENTS

| | | |
|---|---|---|
| WO | 2010049120 A1 | 5/2010 |
| WO | 2011044823 A1 | 4/2011 |

OTHER PUBLICATIONS

International Search Report and Written Opinion—PCT/US2013/030025—ISA/EPO—Jul. 18, 2013.
Alas, et al., "Inter-Access Point Protocol", Wikipedia, 2003, 2 pgs.
Rath A., et al., "Fast Handover in Cellular Networks with Femtocells," IEEE International Conference on Communications (ICC), 2012, pp. 2752-2757.

* cited by examiner

METHOD AND SYSTEM FOR COMMUNICATING BETWEEN SMALL CELLS USING OVER-THE-AIR TRANSMISSIONS

CLAIM OF PRIORITY UNDER 35 U.S.C. §119

The present Application for Patent claims priority to U.S. Provisional Application No. 61/609,227, filed on Mar. 9, 2012, assigned to the same assignee hereof, and hereby expressly incorporated by reference herein.

BACKGROUND

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ect.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional small cells can be deployed to provide more robust wireless coverage to mobile devices. Small cells are low power base stations which transmit at a lower power than macrocells and have smaller coverage than macrocells. For example, small cells (e.g., which can be commonly referred to as Home NodeBs or Home eNBs, collectively referred to as H(e)NBs, femto nodes, femtocell nodes, pico nodes, micro nodes, etc.) can be deployed for incremental capacity growth, richer user experience, in-building or other specific geographic coverage, and/or the like. In some configurations, such small cells are connected to the Internet via broadband connection (e.g., digital subscriber line (DSL) router, cable or other modem, etc.), which can provide the backhaul link to the mobile operator's network. In this regard, small cells are often deployed in homes, offices, etc. without consideration of a current network environment.

It is desirable for small cells located in the same area, e.g., a house or a building, to be able to communicate with each other directly in order to, for example, distribute load between adjacent small cells, prevent frequent handoffs, coordinate RF channel allocation to avoid inter-cell interference, and various other reasons. Currently, most of the communication between small cells takes place over the backhaul connection. Therefore, there is a need for another mechanism for facilitating communication between small cells.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects of the embodiments described herein, there is provided a system and method for over-the-air communication between small cells. In one embodiment, a system may determine an information attribute for an over-the-air transmission from the source small cell to a destination small cell. The system may select an over-the-air channel from a set of channels based on the information attribute and send the over-the-air transmission on the selected over-the-air channel to the destination small cell.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
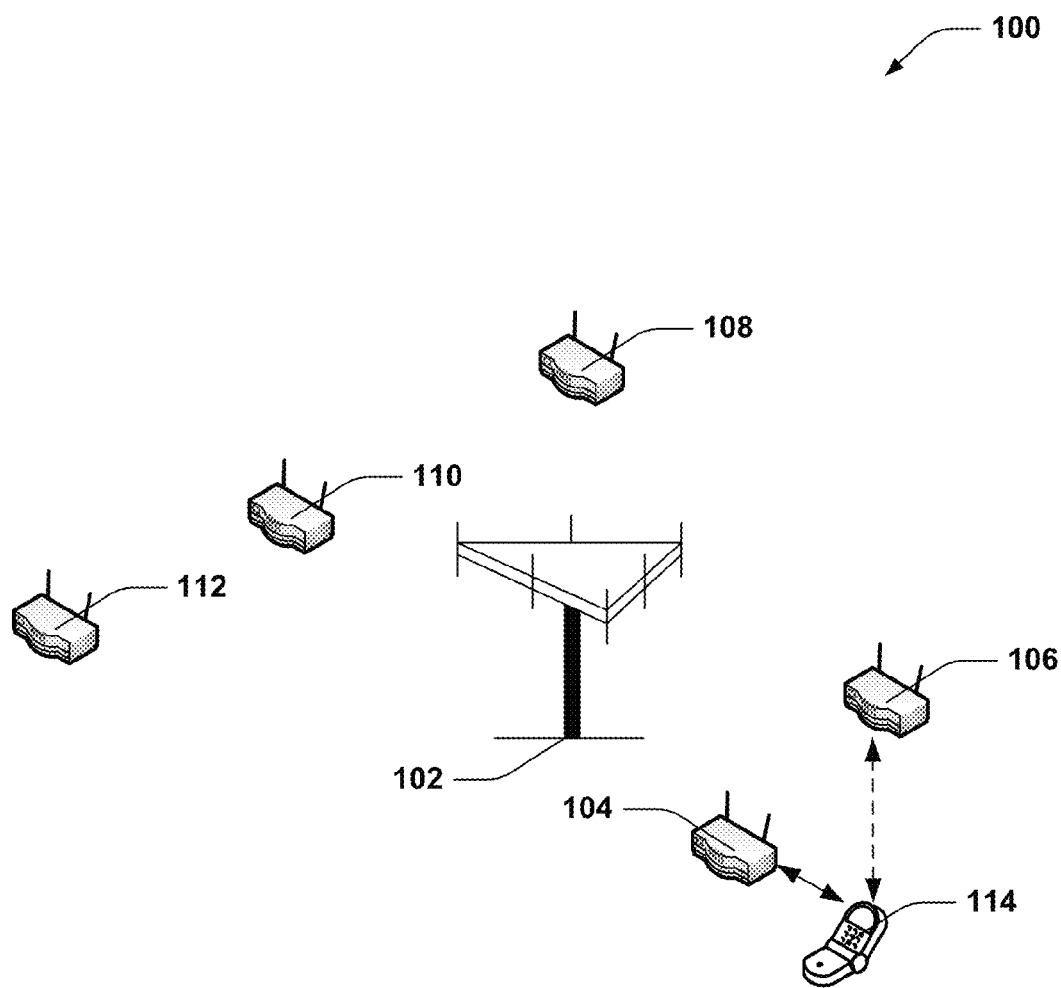
FIG. 1 is a block diagram of an example system that facilitates over-the-air (OTA) communication between neighboring small cells.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Moreover, various aspects are described herein in connection with a base station.

A base station may be utilized for communicating with wireless terminal(s) and may also be referred to as an access point, femto node, a pico node, micro node, a Node B, evolved Node B (eNB), home Node B (HNB) or home evolved Node B (HeNB), collectively referred to as H(e)NB, or some other terminology. These base stations are generally considered small cells. For example, a small cell generally transmits at a lower power compared to a macro base station associated with a wireless wide area network (WWAN). As such, the coverage area of the small cell can be substantially smaller than the coverage area of a macro base station.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long- range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 shows an example wireless communication system 100. System 100 includes a macro base station 102 that can provide one or more devices with access to a wireless network, as well as a plurality of small cells 104, 106, 108, 110, and 112, which can also provide wireless network access over a backhaul link with a mobile network over a broadband internet connection. In one example, small cells 104, 106, 108, 110, and/or 112 can be other types of low power base stations, a relay node, a device (e.g., communicating in peer-to-peer or ad-hoc mode with other devices), etc. Each small cell forms a small cell (not shown in FIG. 1, but described in greater detail below with reference in FIG. 9). Moreover, system 100 comprises a mobile device 114 that communicates with one or more of the small cells 104 and/or 106 to receive wireless access to the mobile network.

Figure 2:
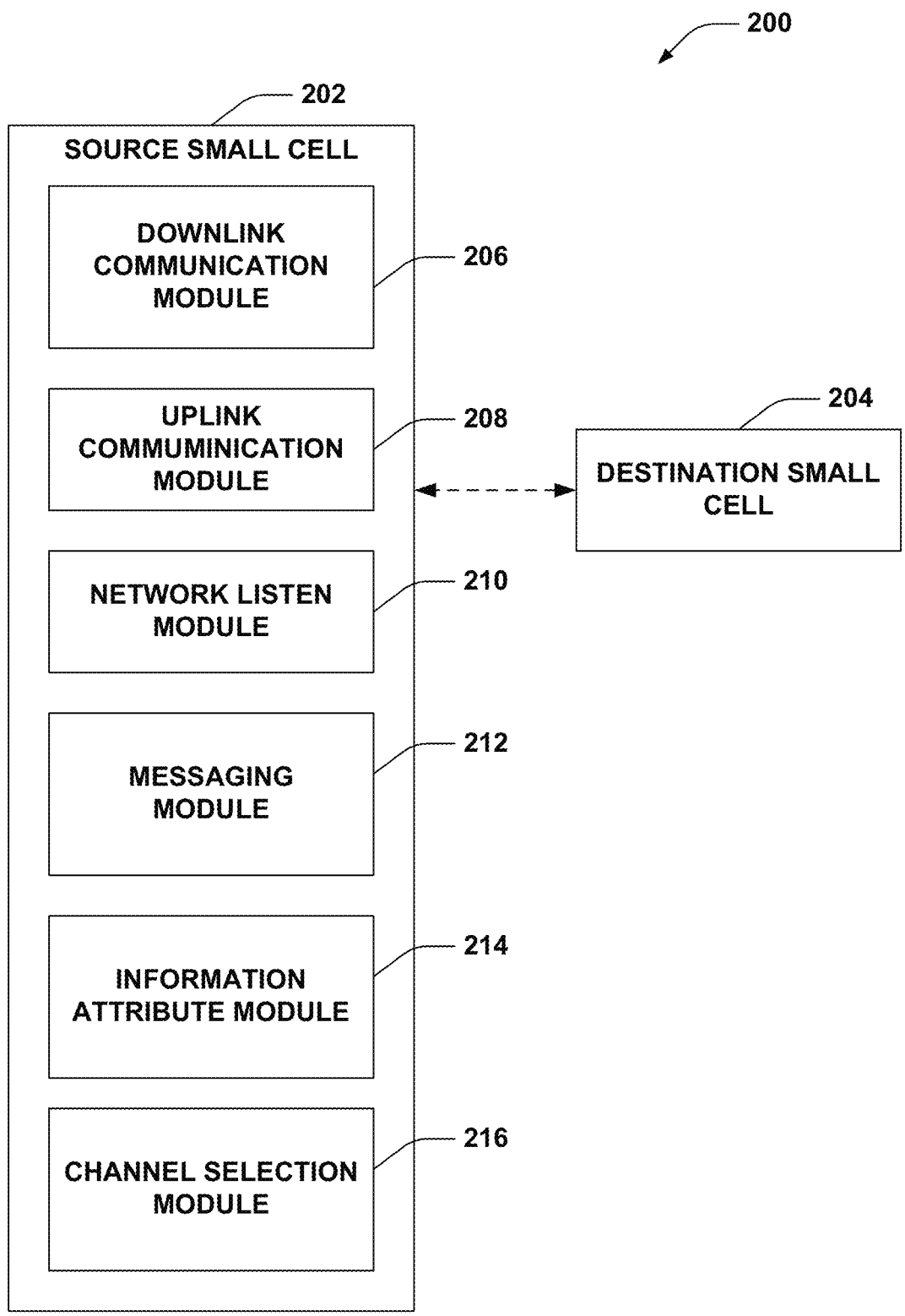
FIG. 2 is a block diagram of an example system that facilitates OTA communication between neighboring small cells according to one aspect.

In a traditional small cell (e.g. small cell) deployment, small cells 104, 106, 108, 110, and 112 communicate with each other using backhaul connection. FIG. 2 illustrates an example system 200 that enables small cells 104, 106, 108, 110, and 112 to communicate directly using existing Over-the-Air (OTA) transmissions. In one aspect, each small cell in system 200, e.g., small cell 202, includes a plurality of OTA communication modules, such as a downlink communication module 206, an uplink communication module 208, a network listening module 210, a messaging module 212, which facilitate communication between small cells 202 and 204 using existing OTA infrastructure, a information attribute module 214, and a channel selection module 216. Each of these modules will be described in greater detail herein below.

In one aspect, the downlink communication module 206 may use downlink channels of small cell 202, which are typically used for communication with mobile devices served by the small cell 202, to communicate with the small cell 204. For example, downlink communication module 206 may use a broadcast channel to communicate information to small cell 204. In this broadcast channel, module 206 may use/set certain bits/fields in a special way to communicate information to the neighboring cells, e.g., small cell 204. For example, a UMTS/LTE small cell 202 can appear to be a hybrid cell or transmit a special Closed Subscriber Group (CSG) ID in a System Information Block 3/1 (i.e., SIB3/SIB1) message to communicate specific information to cell 204. The CSG ID of the cell 202 will be known to the neighboring cells, so they know when a message is being communicated through the change of CSG ID. Moreover, cell 202 can encode its own identity in CSG ID to let its neighboring cells know where the broadcast message came from. In the similar fashion, small cell 204 may reply to the received broadcast message from cell 202 using its on broadcast channel transmission with the CSG ID of cell 204.

In another example, the downlink communication module 206 of small cell 202 may use a synchronization channel to communicate information to small cell 204. For example, on primary synchronization channel, which is always sent by a UMTS cell, the bit to indicate presence/absence of STTD (Space time block coding-based transmit antenna diversity) can be used/modulated to communicate information between small cells. In the similar fashion, small cell 204 may reply to small cell 202 using its own synchronization channel or a different over-the-air channel such as a broadcast channel.

In another example, downlink communication module 206 of small cell 202 may duplicate any downlink channel for purpose of communicating information to other cells. For example, a separate pilot channel, and/or synchronization channel, and/or broadcast channel can be used to communicate information between small cells. In this manner, small cell 202 may use one pilot channel (e.g. first carrier frequency) for communication with mobile devices and a separate pilot channel (e.g., second carrier frequency) for communicating with the neighboring cells. In the similar fashion, small cell 204 may reply to small cell 202 using its duplicated downlink channel(s).

In another example, downlink communication module 206 of small cell 202 may use a multicast channel(s), such as a Multimedia Broadcast Multicast Services (MBMS) for purpose of communicating information to other cells. For example, a multicast transmission specific to a set of small cells (such as neighboring small cells) can be done to communicate information to them. In the similar fashion, small cell 204 may reply to small cell 202 using its multicast channels, such as multimedia broadcast multicast services or the like.

In another aspect, small cell 202 includes an uplink communication module 208 that uses uplink channels/messages of small cell 204, which are typically used by the mobile devices to communicate with the small cell 204, to communicate with the small cell 204. For example, in case of UMTS small cells, certain signatures in PRACH (physical random access channel) preambles can be reserved for small cell to small cell communication and can be used by small cells to communicate information with each other. In the similar fashion, small cell 204 may reply to small cell 202 using unlink channels/messages of small cell 202.

In another aspect, small cell 202 includes a network listening module 210, which is configured to tune to downlink channels of small cell 204 and/or uplink channels of small cell 202 to receive any transmissions from neighboring cell 204, such as broadcasts, multicasts, pilot and/or synchronization messages, random access channel preambles/messages, from small cell 204.

In another aspect, the messaging module 212 of small cell 202 may use proprietary messages and send them at a negotiated frequency/RAT with the small cell 204.

In another aspect, the information attribute module 214 may determining an information attribute for an over-the-air transmission from the source small cell 202 to a destination small cell 204.

In another example, the channel selection module 216 may select an over-the-air channel from a set of channels based on the information attribute.

In various aspects, small cell to small cell communication can be done in an uncoordinated manner, such as periodically, and/or in a coordinated manner such as during specific time slots, SFNs, channel, RF frequency, radio access technology, etc.

It should be also noted that small cells may communicate different types of information. For example, small cell 202 may communicate to small cell 204 such information as small cell load information, capabilities supported by the small cell, availability of certain resources (e.g., channel elements, backhaul bandwidth), indication of Primary Scrambling Code (PSC) or Physical Cell Identity (PCI) confusion in the neighborhood with or without confused PSC/PCI, indication to start transmission of another channel (e.g., another CPICH with different PSC), different requests (e.g., 'change Location Area Code (LAC) / Routing Area Code (RAC) / Tracking Area Code (TAC)', 'Change PSC/PCI', 'Change Tx Power', 'Turn Off', 'Change CSG ID', 'reboot', 'accept handover for a UE', 'change access restrictions and/or mode'), alarms, (e.g., 'inability to accept more users momentarily', 'possibility of shut down', 'loss of backhaul').

In response to the communication from small cell 202, small cell 204 may perform such actions as change its Tx power, change its broadcast information (e.g., parameters in SIBs/MIBs, such as LAC, RAC, CSG ID, CSG Indicator, schedule of a SIB, new SIB, etc., change access restrictions/mide, turn off or reboot, send a message to neighboring small cell, change physical layer (such as PSC/PCI) or upper layer parameters (such as LAC, CSG ID, etc.), acknowledge listening to the UE with specific uplink transmission, transmit additional channel/messages (e.g., transmit an additional physical layer identity, such as PSC), accept certain messages over the backhaul, such as handover related messages.

In one example aspect of an over-the-air communication between small cells, a source small cell 202 (e.g. small cell) may determine an information attribute (e.g. by the information attribute module 214) for an over-the-air transmission from the source small cell 202 to a destination small cell 204. The source small cell 202 may select an over-the-air channel attribute (e.g. by the channel selection module 214) from a set of channels based on the information attribute. For example, the set of channels include at least one of a broadcast channel, a synchronization channel, a dedicated channel, a random access channel, a preamble, a PRACH preamble, a duplicate channel of an existing channel, and a multicast channel. In a further example, the set of channels comprise at least one of a downlink channel of the source small cell 202, an uplink channel of the source small cell 202, a downlink channel of the destination small cell 204, and an uplink channel of the destination small cell 204. The source small cell 202 may send the over-the-air transmission on the selected over-the-air channel to the destination small cell 204.

In one example, the information attribute may include whether the over-the-air transmission is to be sent to a single destination small cell 204 or a plurality of destination small cells. For example, if the over-the-air transmission includes a request to change at least one parameter at the destination small cell 204, a request to the destination small cell 204 to accept handover of an access terminal, an indication to commence transmission on a specified channel, a request to change a transmit power of the destination small cell 204, a request to change an access restriction or access mode of the destination small cell 204, or a request to send a message to a different small cell than the small cell 204. In one example, a plurality of neighboring small cells may listen on a particular signature in PRACH preambles. The particular signature may be based on the neighboring small cell's primary scrambling code (PSC). The source small cell 202 may select a signature in PRACH preambles based on which neighboring small cell it wishes to communicate with. In an additional example, a plurality of neighboring small cells may listen for a particular parameter or value of parameter sent over a broadcast channel. The parameter may be based on each neighboring small cell's PSC/PCI. The source small cell 202 may select the parameter or value of the parameter sent over the broadcast channel based on which neighboring small cell it wishes to communicate with.

In one example, if the over-the-air transmission includes load information for the source small cell 202, capability information supported by the source small cell 202, availability information of at least one resource of the source small cell 202, an indication of primary scrambling code (PSC) confusion in a neighborhood, or an alarm indication, then the transmission may be sent to a plurality of destination small cells. In one example, a plurality of small cells may each listen on the same signature in PRACH preambles. The source small cell 202 may select the same signature in PRACH preambles when it wishes to communicate with the plurality of small cells. In an additional example, a plurality of small cells may listen for the same particular parameter or value of a parameter sent over a broadcast channel. The source small cell 202 may select the same PRACH preamble when it wishes to communicate with the plurality of small cells.

In a related example, the information attribute may further include a delay sensitivity for the over-the-air transmission. For example, if the over-the-air transmission includes a request to the destination small cell 204 to accept handover of an access terminal, an indication to commence transmission on a specified channel, an alarm indication, or a message to another small cell, then the transmission may be considered delay sensitive. In one example, the source small cell 202 may use a signature in PRACH preambles or a synchronization channel to send delay sensitive information.

If the over-the-air transmission includes capability information supported by the source small cell 202 or availability information of at least one resource of the source small cell 202, then the transmission may be considered delay insensitive. For example, the source small cell 202 may use a parameter in a broadcast channel or use an infrequent SIB in a broadcast channel to send delay insensitive information.

In an additional example, the information attribute may further include a rate for information to be sent. For example, if the over-the-air transmission includes load information indicating load details such as which resource blocks in LTE are overloaded and at what time it becomes overloaded, then the transmission may have a high rate for information. The source small cell 202 may use a broadcast channel to send transmissions with a high rate for information.

In an additional example, the information attribute may further include a rate at which information changes. For example, if the over-the-air transmission includes load information indicating high, medium, or low loads, then the transmission may have a high rate at which information changes. The source small cell 202 may use a synchronization channel or a specific signature in PRACH preambles for transmissions that have a high rate at which information changes. The source small cell 202 may use a broadcast channel for transmissions that have a low rate at which information changes.

In an additional example, the information attribute may further include a quantity of information to be sent. For example, if the over-the-air transmission includes load information indicating load details such as which resource blocks in LTE are overloaded and at what time it becomes overloaded, then the transmission may have a large quantity of information to be sent. The source small cell 202 may use a broadcast channel for transmissions that have a large quantity of information to be sent.

The source small cell 202 may select a second over-the-air channel, from the set of channels, to receive a response from the destination small cell 204 and listen (for example with the network listen module 210) for the response from the destination small cell 204, over the selected second over-the-air channel.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 3:
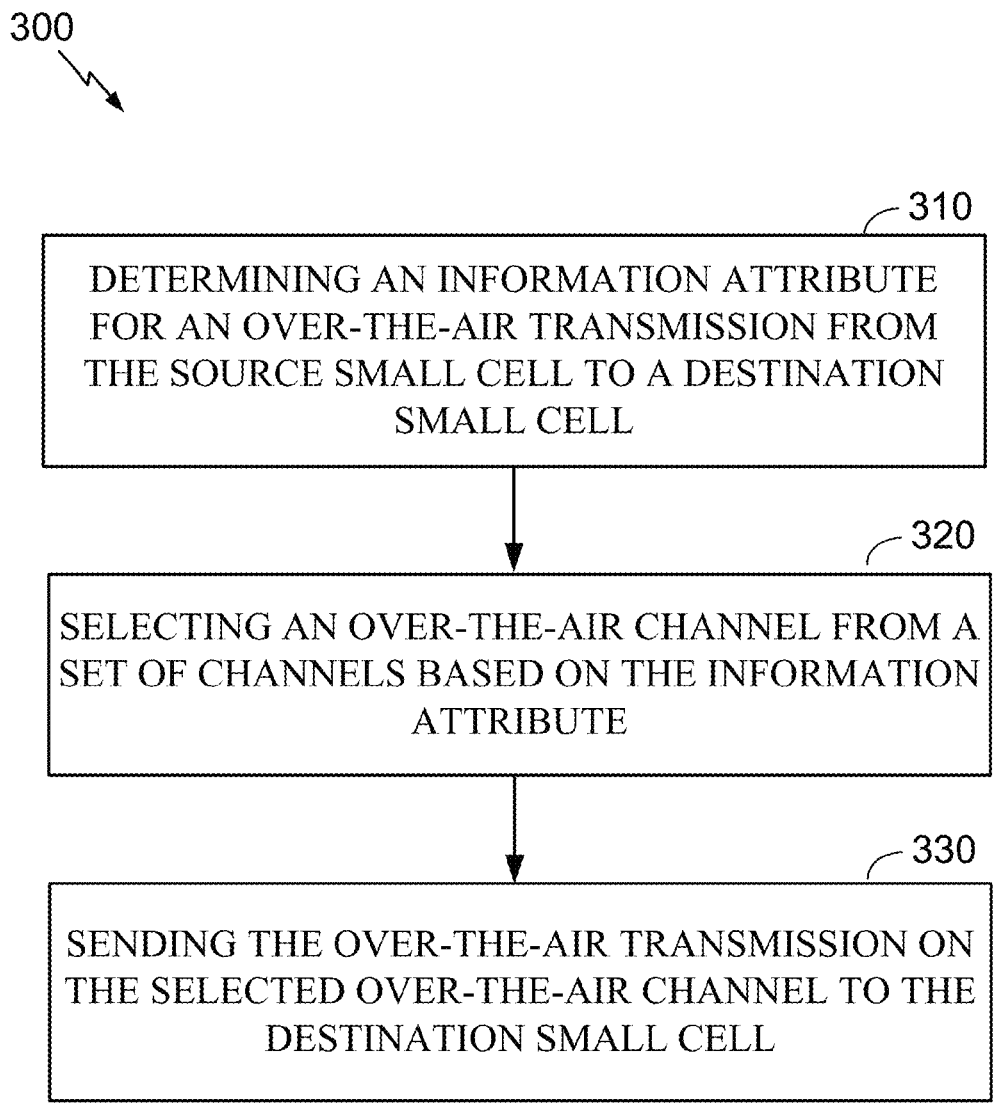
FIG. 3 is a flow chart of an aspect of an example methodology for OTA communication between neighboring small cells.

In accordance with one or more aspects of the embodiments described herein, with reference to FIG. 3, there is shown a methodology 300 for determining a user device location. The method 300, operable by the network entity or the like or component(s) thereof, may involve, at 310, determining an information attribute for an over-the-air transmission from the source small cell 202 to a destination small cell 204. The method 300 may involve, at 320, selecting an over-the-air channel from a set of channels based on the information attribute. The method 300 may involve, at 330, sending the over-the-air transmission on the selected over-the-air channel to the destination small cell 204.

In further related aspects, the set of channels may comprise at least one of a broadcast channel, a synchronization channel, a dedicated channel, a random access channel, a preamble, a PRACH preamble, a duplicate channel of an existing channel, and a multicast channel. The set of channels may comprise at least one of a downlink channel of the source small cell 202, an uplink channel of the source small cell 202, a downlink channel of the destination small cell 204, and an uplink channel of the destination small cell 204. The downlink channel of the source small cell 202 may be additionally used for communicating between the source small cell 202 and mobile devices served by the source small cell 202.

In further related aspects, the information attribute may comprise whether the over-the-air transmission is to be sent to a single destination small cell 204 or a plurality of destination small cell 204s. The over-the-air transmission may be determined to be sent to a plurality of destination small cell 204s if the over-the-air transmission comprise at least one of a load information for the source small cell 202, capability information supported by the source small cell 202, information describing at least one resource of the source small cell 202, an indication of primary scrambling code (PSC) confusion in a neighborhood, and an alarm indication. The over-the-air transmission may be determined to be sent to a single destination small cell 204 if the over-the-air transmission comprise at least one of a request to change at least one parameter at the destination small cell 204, a request to the destination small cell 204 to accept handover of an access terminal, an indication to commence transmission over a specified channel, a request to change a transmit power of the destination small cell 204, a request to change an access restriction or access mode of the destination small cell 204, and a message to the destination small cell 204.

In further related aspects, the information attribute may comprise a delay sensitivity for the over-the-air transmission. Selecting the over-the-air channel may select at least one of a synchronization channel, a random access channel, and a broadcast channel based on the delay sensitivity. The delay sensitivity may be based on whether the over-the-air transmission comprises a request for immediate action. The request for immediate action may comprise at least one of a request to the destination small cell 204 to accept handover of an access terminal, a request to the destination small cell 204 respond to an alarm indication, and a request to the destination small cell 204 to send a message to another small cell.

In further related aspects, the information attribute may comprise a rate for information to be sent. The information attribute may comprise a rate at which information changes. The information attribute may comprise a quantity of information to be sent.

In further related aspects, the method 300 may further comprise selecting a second over-the-air channel, from the set of channels, to receive a response from the destination small cell 204 and listening for the response from the destination small cell 204, over the selected second over-the-air channel. The over-the-air channel may support at least one of UMTS, LTE, CDMA, and WiMax radio access technologies.

Figure 4:
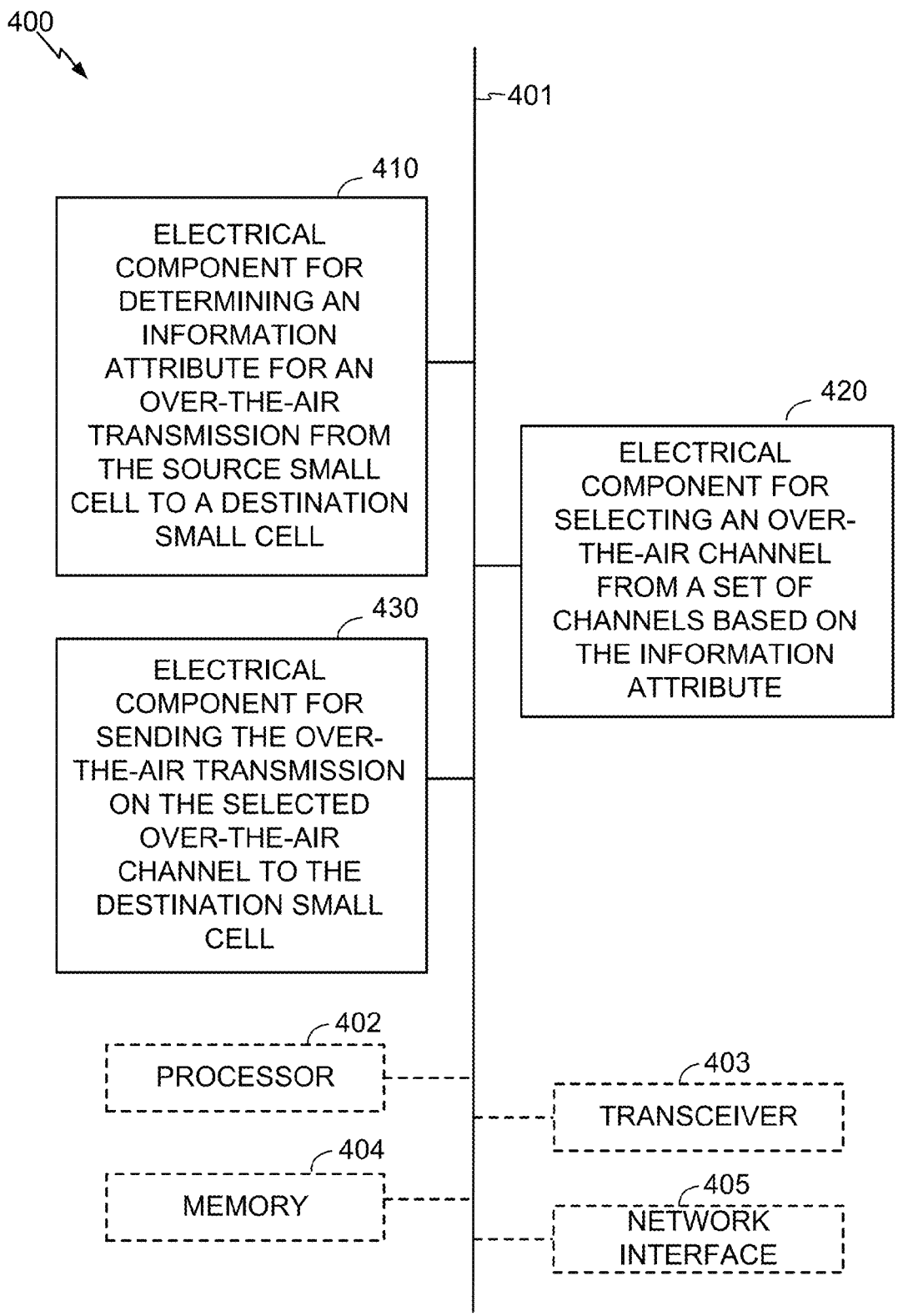
FIG. 4 is a block diagram of an example system for communication between small cells.

In accordance with one or more aspects of the embodiments described herein, FIG. 4 shows a design of an apparatus 400 for determining a user device location. The exemplary apparatus 400 may be configured as a computing device or as a processor or similar device/component for use within. In one example, the apparatus 400 may include functional blocks that can represent functions implemented by a processor, software, or combination thereof (e.g., firmware). In another example, the apparatus 300 may be a system on a chip (SoC) or similar integrated circuit (IC).

In one embodiment, apparatus 400 may include an electrical component or module 410 for determining an information attribute for an over-the-air transmission from the source small cell 202 to a destination small cell 204.

The apparatus 400 may include an electrical component 420 for selecting an over-the-air channel from a set of channels based on the information attribute.

The apparatus 400 may include an electrical component 430 for sending the over-the-air transmission on the selected over-the-air channel to the destination small cell 204.

In further related aspects, the apparatus 400 may optionally include a processor component 402. The processor 402 may be in operative communication with the components 410-794 via a bus 401 or similar communication coupling. The processor 402 may effect initiation and scheduling of the processes or functions performed by electrical components 410-794.

Figure 5:
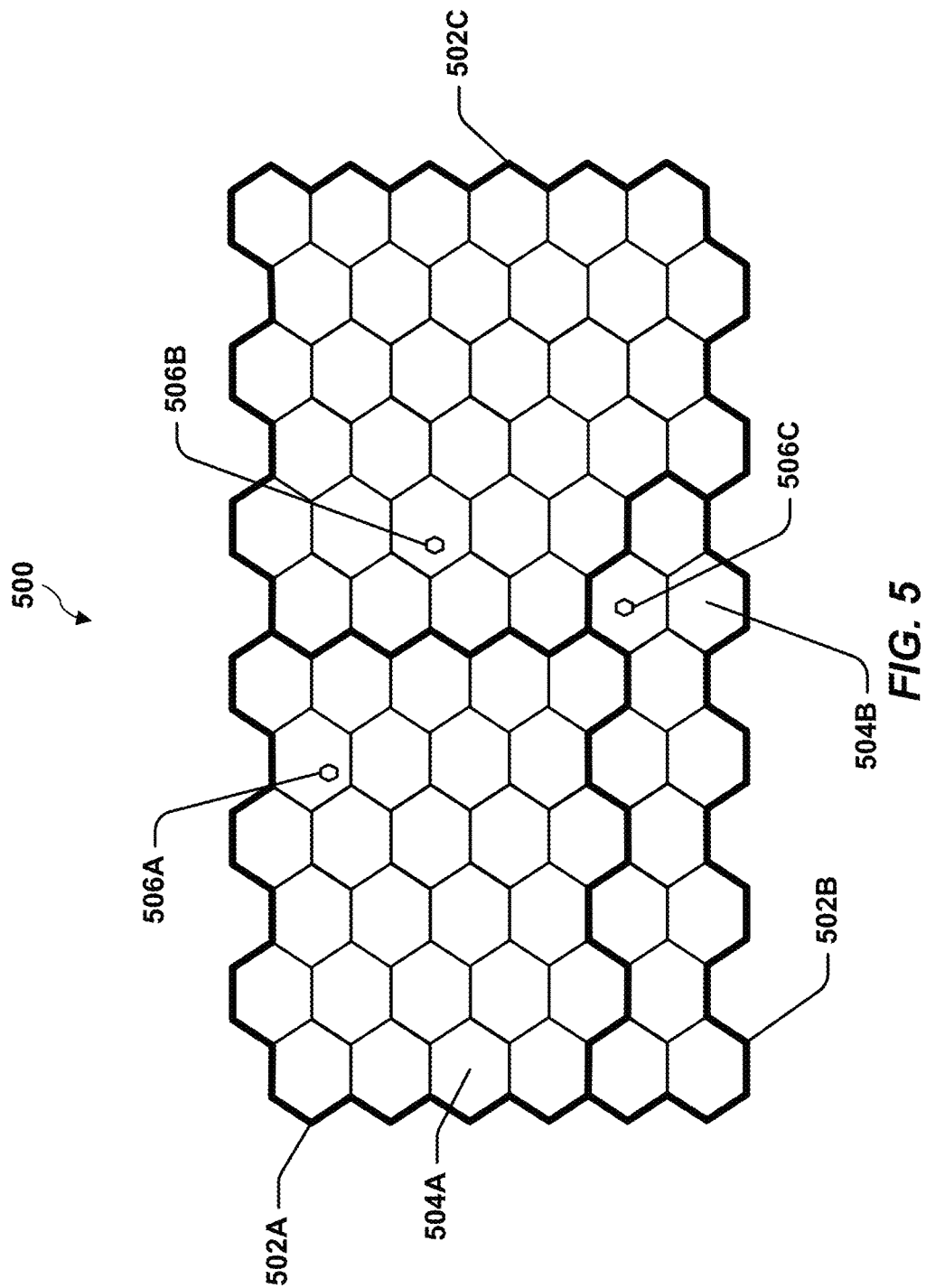
FIG. 5 illustrates an example of a coverage map having several defined tracking areas.

In yet further related aspects, the apparatus 400 may include a radio transceiver component 403. A standalone receiver and/or standalone transmitter may be used in lieu of or in conjunction with the transceiver 403. The apparatus 400 may also include a network interface 405 for connecting to one or more other communication devices or the like. The apparatus 400 may optionally include a component for storing information, such as, for example, a memory device/component 404. The computer readable medium or the memory component 404 may be operatively coupled to the other components of the apparatus 400 via the bus 401 or the like. The memory component 404 may be adapted to store computer readable instructions and data for affecting the processes and behavior of the components 410-430, and sub-components thereof, or the processor 402, or the methods disclosed herein. The memory component 404 may retain instructions for executing functions associated with the components 410-430. While shown as being external to the memory 404, it is to be understood that the components 410-430 can exist within the memory 404. It is further noted that the components in FIG. 4 may comprise processors, electronic devices, hardware devices, electronic sub-components, logical circuits, memories, software codes, firmware codes, etc., or any combination thereof FIG. 5 illustrates an example of a coverage map 500 where several tracking areas 502 (or routing areas or location areas) are defined, each of which includes several macro coverage areas 504. Here, areas of coverage associated with tracking areas 502A, 502B, and 502C are delineated by the wide lines and the macro coverage areas 504 are represented by the hexagons. The tracking areas 502 also include small cell (e.g. femto node) coverage areas 506 corresponding to respective small cell nodes, such as small cells 52 or 202 or system 500, and which may include the components and implement the functions described above with respect to FIGS. 1-5. In this example, each of the small cell coverage areas 506 (e.g., small cell coverage area 506C) is depicted within a macro coverage area 504 (e.g., macro coverage area 504B). It should be appreciated, however, that a small cell coverage area 506 may not lie entirely within a macro coverage area 504. In practice, a large number of small cell coverage areas 506 can be defined with a given tracking area 502 or macro coverage area 504. Also, one or more pico coverage areas (not shown) can be defined within a given tracking area 502 or macro coverage area 504.

Figure 6:
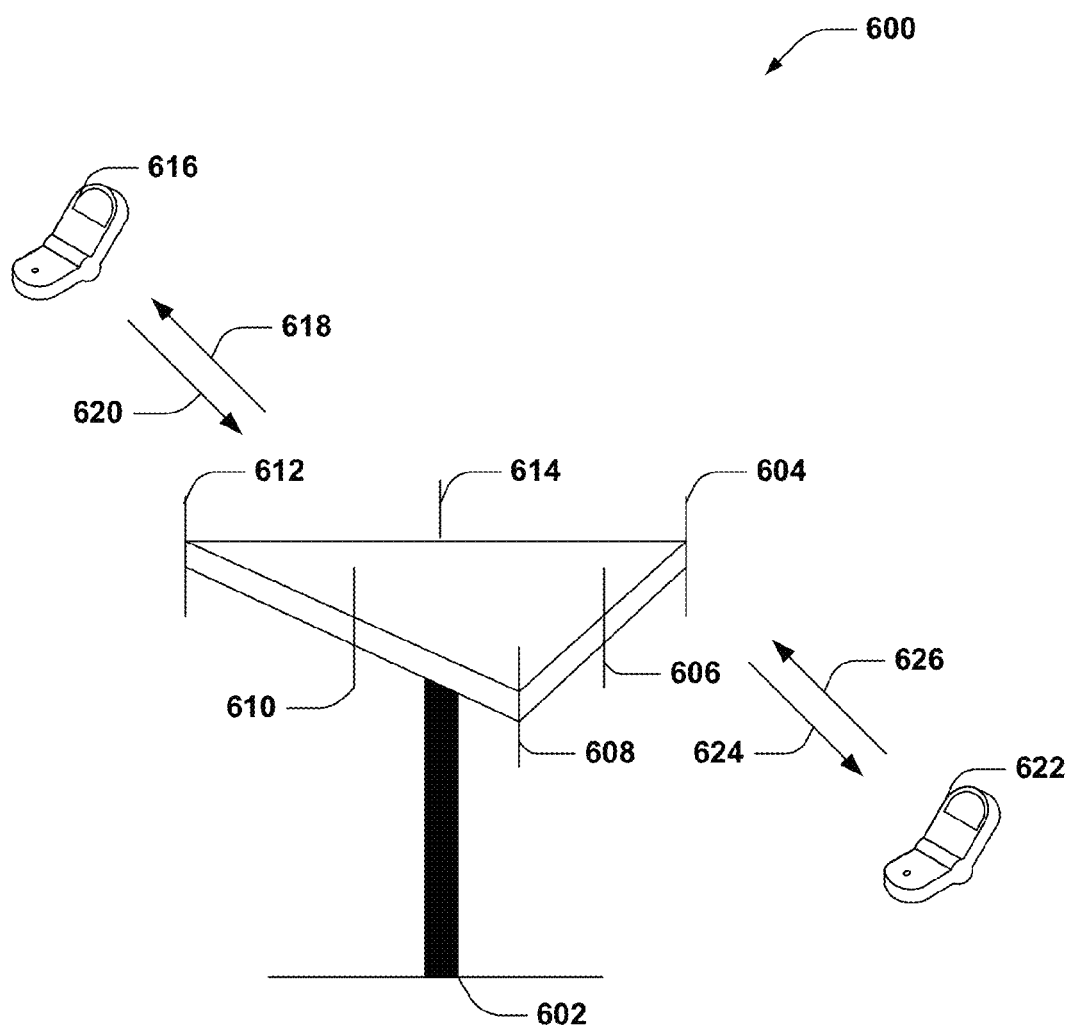
FIG. 6 is a block diagram of an example wireless communication system in accordance with various aspects set forth herein.

Referring now to FIG. 6, a wireless communication system 600 in which mechanisms for intercell communications can be implemented. System 600 comprises a base station 602, which may be a small cell, such as nodes 102 or 202 or system 500, and may include the components and implement the functions described above with respect to FIGS. 1-5. In one aspect, base station 602 can include multiple antenna groups. For example, one antenna group can include antennas 604 and 606, another group can comprise antennas 608 and 610, and an additional group can include antennas 612 and 614. Two antennas are illustrated for each antenna group; however, more or fewer antennas can be utilized for each group. Base station 602 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 602 can communicate with one or more mobile devices such as mobile device 616 and mobile device 622; however, it is to be appreciated that base station 602 can communicate with substantially any number of mobile devices similar to mobile devices 616 and 622. Mobile devices 616 and 622 can be, for example, cellular phones, smart phones, laptops, handheld communication devices, handheld computing devices, satellite radios, global positioning systems, PDAs, and/or any other suitable device for communicating over wireless communication system 600. As depicted, mobile device 616 is in communication with antennas 612 and 614, where antennas 612 and 614 transmit information to mobile device 616 over a forward link 618 and receive information from mobile device 616 over a reverse link 620. Moreover, mobile device 622 is in communication with antennas 604 and 606, where antennas 604 and 606 transmit information to mobile device 622 over a forward link 624 and receive information from mobile device 622 over a reverse link 626. In a frequency division duplex (FDD) system, forward link 618 can utilize a different frequency band than that used by reverse link 620, and forward link 624 can employ a different frequency band than that employed by reverse link 626, for example. Further, in a time division duplex (TDD) system, forward link 618 and reverse link 620 can utilize a common frequency band and forward link 624 and reverse link 626 can utilize a common frequency band.

Each group of antennas and/or the area in which they are designated to communicate can be referred to as a sector of base station 602. For example, antenna groups can be designed to communicate to mobile devices in a sector of the areas covered by base station 602. In communication over forward links 618 and 624, the transmitting antennas of base station 602 can utilize beamforming to improve signal-to-noise ratio of forward links 618 and 624 for mobile devices 616 and 622. Also, while base station 602 utilizes beamforming to transmit to mobile devices 616 and 622 scattered randomly through an associated coverage, mobile devices in neighboring cells can be subject to less interference as compared to a base station transmitting through a single antenna to all its mobile devices. Moreover, mobile devices 616 and 622 can communicate directly with one another using a peer-to-peer or ad hoc technology as depicted. According to an example, system 600 can be a multiple-input multiple-output (MIMO) communication system.

Figure 7:
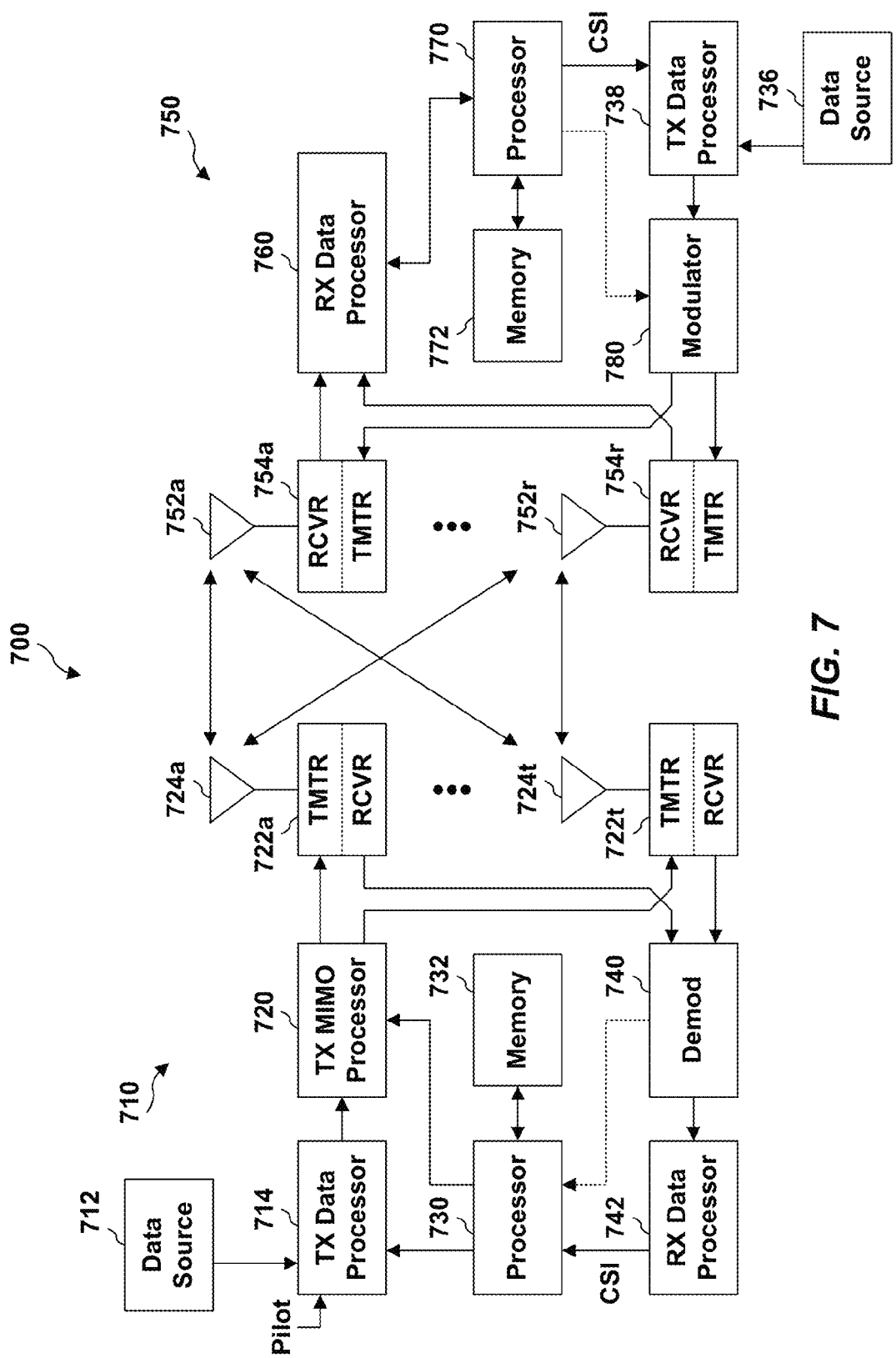
FIG. 7 is an illustration of an example wireless network environment that can be employed in conjunction with the various systems and methods described herein.

FIG. 7 shows an example wireless communication system 700. The wireless communication system 700 depicts one base station 710, which can include a small cell, and one mobile device 750 for sake of brevity. However, it is to be appreciated that system 700 can include more than one base station and/or more than one mobile device, wherein additional base stations and/or mobile devices can be substantially similar or different from example base station 710 and mobile device 750 described below. In addition, it is to be appreciated that base station 710 and/or mobile device 750 can employ the systems (FIGS. 1, 2, 4, and 6) and/or methods (FIG. 3) described herein to facilitate wireless communication therebetween. For example, components or functions of the systems and/or methods described herein can be part of a memory 732 and/or 772 or processors 730 and/or 770 described below, and/or can be executed by processors 730 and/or 770 to perform the disclosed functions.

At base station 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides $N_T$ modulation symbol streams to $N_T$ transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 722a through 722t are transmitted from $N_T$ antennas 724a through 724t, respectively.

At mobile device 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the $N_R$ received symbol streams from $N_R$ receivers 754 based on a particular receiver processing technique to provide $N_T$ "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station 710.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station 710.

At base station 710, the modulated signals from mobile device 750 are received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights.

Processors 730 and 770 can direct (e.g., control, coordinate, manage, etc.) operation at base station 710 and mobile device 750, respectively. Respective processors 730 and 770 can be associated with memory 732 and 772 that store program codes and data. Processors 730 and 770 can also perform functionalities described herein to support selecting a paging area identifier for one or more small cells.

Figure 8:
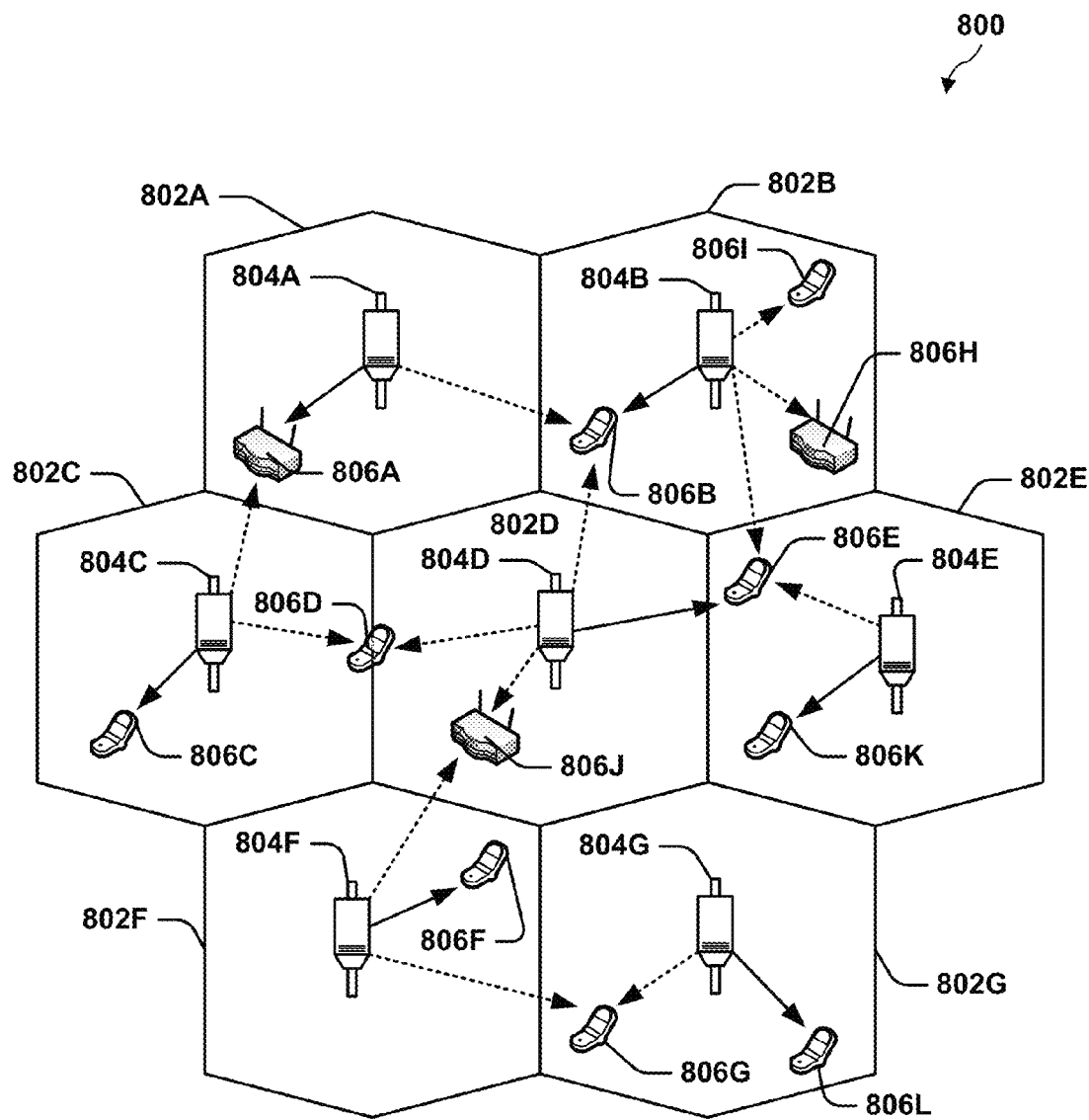
FIG. 8 illustrates an example wireless communication system, configured to support a number of devices, in which the aspects herein can be implemented.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access node 804 (e.g., access nodes 804A-804G). As shown in FIG. 8, mobile devices 806 (e.g., mobile devices 806A-806L) can be dispersed at various locations throughout the system over time. Each mobile device 806 can communicate with one or more access nodes 804 on a forward link (FL) and/or a reverse link (RL) at a given moment, depending upon whether the mobile device 806 is active and whether it is in soft handoff, for example. The wireless communication system 800 can provide service over a large geographic region. In some aspects, some of the mobile devices 806, such as devices 806A, 806H, and 806J, may be small cells, such as nodes 102 or 202 or system 500, and may include the components and implement the functions described above with respect to FIGS. 1-5.

Figure 9:
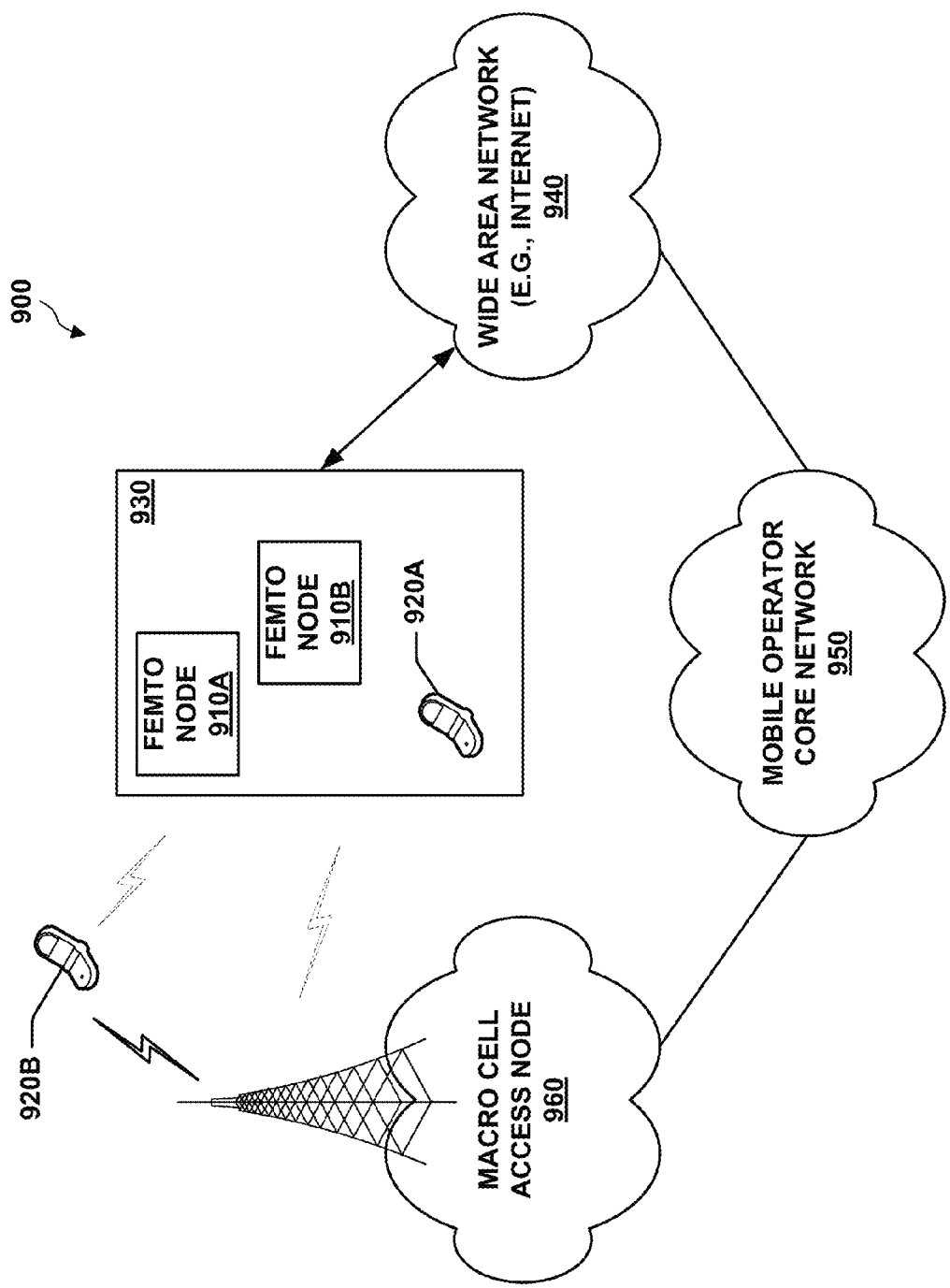
FIG. 9 is an illustration of an exemplary communication system to enable deployment of small cells within a network environment.

FIG. 9 illustrates an exemplary communication system 900 where one or more small cells are deployed within a network environment. Specifically, the system 900 includes multiple small cells 910A and 910B (e.g., small cell nodes or H(e)NB) installed in a relatively small scale network environment (e.g., in one or more user residences 930), which, in one aspect, may correspond to small cells 104, 106, 108, 110, and 112 of FIGS. 1-5. Each small cell 910 can be coupled to a wide area network 940 (e.g., the Internet) and a mobile operator core network 950 via a digital subscriber line (DSL) router, a cable modem, a wireless link, or other connectivity means (not shown). As will be discussed below, each small cell 910 can be configured to serve associated mobile devices 920 (e.g., mobile device 920A) and, optionally, alien mobile devices 920 (e.g., mobile device 920B). In other words, access to small cells 910 can be restricted such that a given mobile device 920 can be served by a set of designated (e.g., home) small cell(s) 910 but may not be served by any non-designated small cells 910 (e.g., a neighbor's small cell).

The owner of a small cell 910 can subscribe to mobile service, such as, for example, 3G mobile service, offered through the mobile operator core network 950. In another example, the small cell 910 can be operated by the mobile operator core network 950 to expand coverage of the wireless network. In addition, a mobile device 920 can be capable of operating both in macro environments and in smaller scale (e.g., residential) network environments. Thus, for example, depending on the current location of the mobile device 920, the mobile device 920 can be served by a macro cell access node 960 or by any one of a set of small cells 910 (e.g., the small cells 910A and 910B that reside within a corresponding user residence 930). For example, when a subscriber is outside his home, he is served by a standard macro cell access node (e.g., node 960) and when the subscriber is at home, he is served by a small cell (e.g., node 910A). Here, it should be appreciated that a small cell 910 can be backward compatible with existing mobile devices 920.

A small cell 910 can be deployed on a single frequency or, in the alternative, on multiple frequencies. Depending on the particular configuration, the single frequency or one or more of the multiple frequencies can overlap with one or more frequencies used by a macro cell access node (e.g., node 960). In some aspects, an mobile device 920 can be configured to connect to a preferred small cell (e.g., the home small cell of the mobile device 920) whenever such connectivity is possible. For example, whenever the mobile device 920 is within the user's residence 930, it can communicate with the home small cell 910.

In some aspects, if the mobile device 920 operates within the mobile operator core network 950 but is not residing on its most preferred network (e.g., as defined in a preferred roaming list), the mobile device 920 can continue to search for the most preferred network (e.g., small cell 910) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the mobile device 920 can limit the search for specific band and channel. For example, the search for the most preferred system can be repeated periodically. Upon discovery of a preferred small cell, such as small cell 910, the mobile device 920 selects the small cell 910 for camping within its coverage area.

For convenience, the disclosure herein describes various functionality in the context of a small cell. It should be appreciated, however, that a pico node can provide the same or similar functionality as a small cell, but for a larger coverage area. For example, a pico node can be restricted, a home pico node can be defined for a given mobile device, and so on.

A wireless multiple-access communication system can simultaneously support communication for multiple wireless mobile devices. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal In one or more aspects, the functions, methods, or algorithms described may be implemented in hardware, software, firmware, or any combination thereof If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method operable by a source small cell for communication between small cells, the method comprising:
    determining an information attribute for an over-the-air transmission from the source small cell to a destination small cell, the information attribute comprising whether the over-the-air transmission is to be sent to a single destination small cell or a plurality of destination small cells and a quantity of information to be sent, wherein the quantity of information to be sent indicates an expected overload condition for resource blocks of the over-the-air transmission;
    selecting an over-the-air channel from a set of channels based on the information attribute; and
    sending the over-the-air transmission on the selected over-the-air channel to the destination small cell.

2. The method of claim 1, wherein the set of channels comprises at least one of a broadcast channel, a synchronization channel, a dedicated channel, a random access channel, a preamble, a PRACH preamble, a duplicate channel of an existing channel, or a multicast channel.

3. The method of claim 1, wherein the set of channels comprises at least one of a downlink channel of the source small cell, an uplink channel of the source small cell, a downlink channel of the destination small cell, or an uplink channel of the destination small cell.

4. The method of claim 1, wherein the information attribute comprises a delay sensitivity for the over-the-air transmission.

5. The method of claim 1, wherein the information attribute comprises a rate at which the information changes.

6. The method of claim 1, further comprising:
    selecting a second over-the-air channel, from the set of channels, to receive a response from the destination small cell; and
    listening for the response from the destination small cell, over the selected second over-the-air channel.

7. The method of claim 1, wherein the over-the-air channel supports at least one of Universal Mobile Telecommunication System (UMTS), 3GPP Long Term Evolution (LTE), code division multiple access (CDMA), and IEEE 802.16 (WiMax) radio access technologies.

8. The method of claim 1, wherein the information attribute comprises a rate for the information to be sent, and wherein the rate of information to be sent indicates an expected overload condition for resource blocks of the over-the-air transmission.

9. The method of claim 1, wherein the selecting the over-the-air channel from the set of channels comprises selecting a broadcast channel from the set of channels when the expected overload condition indicate the resource blocks will be overloaded.

10. The method of claim 3, wherein the downlink channel of the source small cell is additionally used for communicating between the source small cell and mobile devices served by the source small cell.

11. The method of claim 4, wherein selecting the over-the-air channel selects, based on the delay sensitivity, at least one of a synchronization channel, a random access channel, or a broadcast channel .

12. The method of claim 4, wherein the delay sensitivity is based on whether the over-the-air transmission comprises a request for immediate action.

13. The method of claim 10, wherein the over-the-air transmission is determined to be sent to a plurality of destination small cells if the over-the-air transmission comprises at least one of a load information for the source small cell, capability information supported by the source small cell, information describing at least one resource of the source small cell, an indication of primary scrambling code (PSC) confusion in a neighborhood, or an alarm indication.

14. The method of claim 10, wherein the over-the-air transmission is determined to be sent to a single destination small cell if the over-the-air transmission comprises at least one of a request to change at least one parameter at the destination small cell, a request to the destination small cell to accept handover of an access terminal, an indication to commence transmission over a specified channel, a request to change a transmit power of the destination small cell, a request to change an access restriction or access mode of the destination small cell, or a message to the destination small cell.

15. The method of claim 12, wherein the request for immediate action comprises at least one of a request to the destination small cell to accept handover of an access terminal, a request to the destination small cell respond to an alarm indication, or a request to the destination small cell to send a message to another small cell.

16. A wireless communication apparatus, comprising:
at least one processor configured to:
determine an information attribute for an over-the-air transmission from a source small cell to the destination small cell, the information attribute comprising whether the over-the-air transmission is to be sent to a single destination small cell or a plurality of destination small cells and a quantity of information to be sent, wherein the quantity of information to be sent indicates an expected overload condition for resource blocks of the over-the-air transmission;
select an over-the-air channel, from a set of channels, for an over-the-air transmission from a source small cell to the destination small cell, based on the information attribute; and
receive an over-the-air transmission from the source small cell over the over-the-air channel; and
a memory coupled to the at least one processor for storing data.

17. The apparatus of claim 16, wherein the set of channels further comprises at least one of a broadcast channel, a synchronization channel, a dedicated channel, a random access channel, a preamble, a PRACH preamble, a duplicate channel of an existing channel, or a multicast channel.

18. The apparatus of claim 16, wherein the set of channels comprises at least one of a downlink channel of the source small cell, an uplink channel of the source small cell, a downlink channel of the destination small cell, or an uplink channel of the destination small cell.

19. The apparatus of claim 16, wherein the downlink channel of the source small cell is additionally used for communicating between the source small cell and mobile devices served by the source small cell.

20. The apparatus of claim 16, wherein the information attribute comprises a delay sensitivity for the over-the-air transmission.

21. The apparatus of claim 16, wherein the information attribute comprises a rate at which the information changes.

22. The apparatus of claim 16, wherein the information attribute comprises a rate for the information to be sent, and wherein the rate of information to be sent indicates an expected overload condition for resource blocks of the over-the-air transmission.

23. The apparatus of claim 16, wherein the at least one processor is configured to select a broadcast channel from the set of channels when the expected overload condition indicate the resource blocks will be overloaded.

24. A wireless communication apparatus, comprising:
processor means for determining an information attribute for an over-the-air transmission from a source small cell to the destination small cell, the information attribute comprising whether the over-the-air transmission is to be sent to a single destination small cell or a plurality of destination small cells and a quantity of information to be sent, wherein the quantity of information to be sent indicates an expected overload condition for resource blocks of the over-the-air transmission;
processor means for selecting an over-the-air channel, from a set of channels, for an over-the-air transmission from a source small cell to the destination small cell, based on the information attribute; and
processor means for receiving an over-the-air transmission from the source small cell over the over-the-air channel.

25. The apparatus of claim 24, wherein the set of channels comprises at least one of a broadcast channel, a synchronization channel, a dedicated channel, a random access channel, a preamble, a PRACH preamble, a duplicate channel of an existing channel, or a multicast channel.

26. The apparatus of claim 24, wherein the downlink channel of the source small cell is additionally used for communicating between the source small cell and mobile devices served by the source small cell.

27. The apparatus of claim 24, wherein the information attribute comprises a delay sensitivity for the over-the-air transmission.

28. The apparatus of claim 24, wherein the information attribute comprises a rate at which the information changes.

29. The apparatus of claim 24, wherein the information attribute comprises a rate for the information to be sent, and wherein the rate of information to be sent indicates an expected overload condition for resource blocks of the over-the-air transmission.

30. The apparatus of claim 24, wherein the processor means for selecting the over-the-air channel from the set of channels comprises processor means for selecting a broadcast channel from the set of channels when the expected overload condition indicate the resource blocks will be overloaded.

31. A non-transitory computer-readable medium, comprising:
code for causing at least one computer to:
determine an information attribute for an over-the-air transmission from a source small cell to the destination small cell, the information attribute comprising whether the over-the-air transmission is to be sent to a single destination small cell or a plurality of destination small cells and a quantity of information to be sent, wherein the quantity of information to be sent indicates an expected overload condition for resource blocks of the over-the-air transmission;
select an over-the-air channel, from a set of channels, for an over-the-air transmission from a source small cell to the destination small cell, based on the information attribute; and
receive an over-the-air transmission from the source small cell over the over-the-air channel.

32. The non-transitory computer-readable medium of claim 31, wherein the set of channels comprises at least one of a broadcast channel, a synchronization channel, a dedicated channel, a random access channel, a preamble, a PRACH preamble, a duplicate channel of an existing channel, or a multicast channel.

33. The non-transitory computer-readable medium of claim 31, wherein the set of channels comprises at least one of a downlink channel of the source small cell, an uplink channel of the source small cell, a downlink channel of the destination small cell, or an uplink channel of the destination small cell.

34. The non-transitory computer-readable medium of claim 31, wherein the downlink channel of the source small cell is additionally used for communicating between the source small cell and mobile devices served by the source small cell.

35. The non-transitory computer-readable medium of claim 31, wherein the information attribute comprises a delay sensitivity for the over-the-air transmission.

36. The non-transitory computer-readable medium of claim 31, wherein the information attribute comprises a rate at which the information changes.

37. The non-transitory computer-readable medium of claim 31, wherein the information attribute comprises a rate at which the information is sent, and wherein the rate of information to be sent indicates an expected overload condition for resource blocks of the over-the-air transmission.

38. The non-transitory computer-readable medium of claim 31, wherein the code causes the at least one computer to select a broadcast channel from the set of channels when the expected overload condition indicate the resource blocks will be overloaded.

* * * * *